(12) United States Patent
Park et al.

(10) Patent No.: US 6,616,844 B2
(45) Date of Patent: Sep. 9, 2003

(54) METHOD FOR TREATING HIGH-CONCENTRATED ORGANIC WASTEWATER USING BIO-MAKER

(75) Inventors: Wan Cheol Park, Seoul (KR); Tae Hyung Kim, Seongnam-si (KR); Chang Ju Lee, Gwachun-si (KR); Hun Jung, Pazu-si (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/974,305

(22) Filed: Oct. 9, 2001

(65) Prior Publication Data

US 2002/0074287 A1 Jun. 20, 2002

(30) Foreign Application Priority Data

Oct. 13, 2000 (KR) .................................... 2000-60237

(51) Int. Cl.⁷ ................ C02F 3/30; C02F 3/04
(52) U.S. Cl. ............... 210/605; 210/617; 210/623; 210/629; 210/631; 210/151; 210/195.3; 210/202; 210/220; 210/259; 210/903; 210/908
(58) Field of Search ................ 210/605, 609, 210/615–617, 622, 623, 629, 631, 150, 151, 195.1, 195.3, 202, 205, 220, 259, 903, 908, 906

(56) References Cited

U.S. PATENT DOCUMENTS

| | | | | |
|---|---|---|---|---|
| 3,607,736 A | * | 9/1971 | Miyaji | 210/610 |
| 4,043,936 A | * | 8/1977 | Francis et al. | 588/2 |
| 4,167,479 A | * | 9/1979 | Besik | 210/610 |
| 4,188,289 A | * | 2/1980 | Besik | 210/617 |
| 4,322,296 A | * | 3/1982 | Fan et al. | 210/610 |
| 4,816,158 A | * | 3/1989 | Shimura et al. | 210/610 |
| 5,702,572 A | * | 12/1997 | Fujimura et al. | 204/157.15 |
| 5,919,367 A | * | 7/1999 | Khudenko | 210/605 |
| 5,958,239 A | * | 9/1999 | Sing | 210/605 |
| 6,030,533 A | * | 2/2000 | Karamanev et al. | 210/610 |
| 6,083,386 A | * | 7/2000 | Lloyd | 210/195.1 |
| 6,312,599 B1 | * | 11/2001 | Reid | 210/605 |

FOREIGN PATENT DOCUMENTS

| | | | |
|---|---|---|---|
| DE | 3226797 | * | 1/1984 |
| JP | 11-104690 | * | 4/1999 |

OTHER PUBLICATIONS

"Anaerobic Oxidation Of Ammonium Is A Biologically Mediated Process" by Astrid A. van de Graff, et al., *Applied and Environmental Microbiology*, vol. 61, No. 4, p. 1246–1251 (Apr. 1995).

"The Sequencing Batch Reactor As A Powerful Tool For The Study Of Slowly Growing Anaerobic Ammonium-Oxidizing Microorganisms" by M. Strous, et al., *Appl. Microbiol. Biotechnol.*, vol. 50, p. 589–596 (1998).

"Ammonia Volatilization From A Piggery Pond" by Andy Shilton, *Wat. Sci. Tech.* vol. 33, No. 7, p. 183–189 (1996).

"Intermittent Aeration Of Pig Slurry–Farm Scale Experiments For Carbon And Nitrogen Removal" by Jose R. Bicudo, et al., *Wat. Sci. Tech.* vol. 32, No. 12, p. 83–90 (1995).

"Nitrification, Denitrification and Biological Phosphate Removal In Sequencing Batch Reactors Treating Piggery Wastewater" by G. Bortone, et al., *Wat. Sci. Tech.* vol. 26, No. 5–6, p. 977–985 (1992).

* cited by examiner

*Primary Examiner*—Fred Prince
(74) *Attorney, Agent, or Firm*—Pennie & Edmonds LLP

(57) ABSTRACT

The present invention is related to a method for treating high-concentrated organic wastewater, such as night soil or livestock wastewater, which has high levels of nitrogen and phosphorous. In particular, it is related to a method for treating night soil or livestock wastewater having high levels of nitrogen and phosphorous, comprising an anaerobic ammonium oxidizing (Anammox) step and a biopond step. The process for treating wastewater according to the present invention provides good efficiency in removing organic material and nutrients.

6 Claims, 3 Drawing Sheets

Clushed Stones

Air

METHOD FOR TREATING HIGH-CONCENTRATED ORGANIC WASTEWATER USING BIO-MAKER

FIELD OF THE INVENTION

The present invention is related to a method for treating high-concentrated organic wastewater, such as night soil or livestock wastewater, which has high levels of nitrogen and phosphorous. In particular, it is related to a method for treating night soil or livestock wastewater having high levels of nitrogen and phosphorous, comprising an anaerobic ammonium oxidizing (Anammox) step and a biopond step.

BACKGROUND OF THE INVENTION

The treatment of night soil or livestock wastewater has been regarded as a difficult and troublesome problem. No technique has been recognized as being the perfect solution even though many approaches have been taken. Usually, night soil or livestock wastewater is first collected into one place and treated by a locally shared treatment plant because sharing a treatment plant provides the advantage of convenient management and operation. However, such shared treatment plants have never demonstrated any success in removing high levels of organic material and nitrogen, which is generally found in extremely higher concentrations than those expected from an amount of organic material in night soil or livestock wastewater.

Furthermore, another conventional method of treating very highly concentrated night soil or livestock wastewater is dilution. However, the dilution is not efficient in that it requires consumption of an extremely large amount of water. For example, treating livestock wastewater having 15,000 mg/L of BOD by dilution needs 75 times this amount of water. Moreover, the dilution procedure requires a sufficiently large plant to hold this large amount of water. This leads to increase costs in building plants, in aerating the plant, and in fitting complementary equipment.

Other conventional methods for treating night soil or livestock wastewater focus on the removal of organic material and, thus, can not provide an efficient means for removing nitrogen or phosphorous, even though nitrogen and phosphorous are recognized as the main contaminants that causes eutrophication of lakes and marshes.

Studies have been made on various methods for treating night soil or livestock wastewater. In the removal of nitrogen from livestock wastewater, rates of variation in loading have been investigated in Bortone G., Gemeli, S. and Rambaldi, A. "Nitrification, Denitrification and Biological Phosphate Removal in SBR Treating Piggery Wastewater", Wat, Sci. Tech., Vol, No. 5-6, p 977–985, 1992), which describes a ratio of an average flow rate per day to a maximum flow rate per day as 1.43, and a ratio of a maximum to a minimum of flow rate per hour as being more than 8.

According to Strous, M. et al., it takes about 1 year to make compliant Anammox-causing microorganisms, and such microorganisms have good sedimentation properties and an activity of 0.02 mg $NH_4^+$-N/mg biomass/hr (Strous, M., heijnen, J., Kuenen, J., G. and Jetten, M. S. M. "The sequencing batch reactor as a powerful tool for the study of slowly growing anaerobic ammonium-oxidizing microorganisms", Appl. Microbiol. Biotechnol., Vol. 50, p 589–596, 1998). According to Van de Graff, A. A. et al., Anammox activity is 66 ng $NH_4^+$-N/mg VS/hr, and this activity can be affected even by an extremely small amount of $O_2$ and depends absolutely on $NO_3^-$. The amount of microorganisms is directly proportionate to the biomass in the culture bath (Van de Graff, A. A., Mulder, A., de Bruijn, P., Jetten, M. S. M., Robertson, L. A. and Kuenen, J. G., "Anaerobic oxidation of ammonium in a biologically mediated process", Appl. Environ. Microbiol. Vol. 61, p. 1246–1251, 1995).

A study has been reported to quantify ammonia volatilization from a piggery pond in order to determine its significance as a nitrogen removal mechanism (Andy, S., "Ammonia volatilization from a piggery pond", Wat. Sci. Tech., Vol. 33, No. 7, p 183–199, 1996). The rate of ammonia volatilization greatly varies within the range of 355 to 1534 $mg/m^2/d$, depending on the pH. Upon the volatilization of ammonia, the pH and the COD tend to decrease slowly.

The removal efficiency rate of total nitrogen (TK) from piggery wastewater was 86% when a reactor was operated with mixed liquor suspended solids (MLSS) being 17,000 mg/L during an intermittent aeration process. (José R. Bicudo and Ivo F. Svoboda, "Intermittent aeration of pig slurry—farm scale experiments for carbon and nitrogen removal," Wat. Sci. Tech., Vol 32 No 12 pp 83–90, 1995)

SUMMARY OF THE INVENTION

The objective of this invention is to provide a method for the treatment of wastewater having high concentrations of nitrogen and phosphorus, such as night soil or livestock, and an apparatus used therefor.

In order to achieve the above objective, we, the applicants, provide a novel method for the treatment of wastewater that includes an Anammox step and a biopond step. This method adopts solid-liquid separation instead of dilution with water.

In particular, this method comprises the following steps:
(a) equalizing a flow rate and an amount of concentrated wastewater having at least 10,000 mg/L of BOD in an equalization tank,
(b) carrying out solid-liquid separation of the equalized wastewater from step (a) by adding an aggregating agent thereto so that the concentrations of organic material and nitrogen can be adjusted to desired levels,
(c) stripping ammonia selectively from the wastewater with the concentration of organic material unchanged,
(d) fermenting non-degradable organic material in the wastewater from step (c) by using an anaerobic microorganism, whereby the material can be converted into forms that can be easily fed to aerobic microorganisms in subsequent steps; and, also, fermenting the sludge that is returned from step (i) below to produce organic acids,
(e) carrying out Anammox reaction of ammonia in the wastewater with $NO_2$—N in the sludge, which underwent the anaerobic fermentation in step (d) after being returned from step (i),
(f) activating soil microorganisms that are contained as a solid form in a biopond,
(g) feeding the activated microorganisms into a denitrification-inducing aeration tank, which then contributes both to the degradation of organic material and to the nitrification from ammonia nitrogen in the wastewater from step (e) to $NO_3$—N in cooperation with aerobic microorganisms, which already exist in the aeration tank, and mixing to induce denitrification,
(h) denitrificating the wastewater from step (g) by reducing nitrates in the wastewater to nitrogen through endogeneous respiration of the microorganisms under a condition in which oxygen does not exist and external carbon sources are not introduced, (i) carrying out a solid-liquid separation of the wastewater from the microorganisms and returning a part of the precipitated sludge to step (d) above, and (j) removing any residue from the supernatant from step (i) by aggregating them and effluenting the finally treated wastewater.

The method of the invention can be carried out by using an apparatus comprising the following elements:

(a) an equalization tank for equalizing the flow rate and concentration of the wastewater that has originated from the source, (b) a chemical solid-liquid separator for adjusting the concentration of the organic material and nitrogen, (c) a stripping tank for selectively removing ammonia nitrogen while leaving the concentration of organic material in the wastewater unchanged, (d) an anaerobic fermenter for both fermenting non-degradable organic material in the wastewater by using an anaerobic microorganism, whereby said organic material can be converted into forms that can be easily fed to aerobic microorganisms in subsequent steps; and for fermenting the sludge that is returned from the sedimentation tank below to produce organic acids;

(e) an Anammox tank for reacting ammonia in the wastewater with $NO_2$—N in said sludge to generate nitrogen gases;

(f) a biopond to contain solidified soil microorganisms and to activate and feed them into a denitrification-inducing aeration tank;

(g) a denitrification-inducing aeration tank for both the degradation of organic material in the wastewater by aerobic microorganisms, which already exist in the aeration tank and are fed from said biopond, and for the nitrification of ammonia nitrogen into $NO_3$—N;

(h) a denitrification tank to reduce nitrates in the wastewater to nitrogen through endogeneous respiration of the microorganisms under a condition in which oxygen does not exist and external carbon sources are not introduced;

(i) a sedimentation tank for solid-liquid separation of microorganisms from the denitrified wastewater in which the organic material has been nearly completely oxidized;

(j) an aggregation-sedimentation tank for aggregating and removing the residual material from the supernatant obtained from said sedimentation tank; and (k) a dewatering tank for reducing part or all of the water in the sludge discharged from said solid-liquid separator, anaerobic fermenter, sedimentation tank and aggregation-sedimentation tank.

A feature of the invention is the use of solid-liquid separation for reducing in the wastewater the amount of suspended material having a high concentration of organic material, rather than diluting the wastewater.

Another feature of the apparatus is that it includes an ammonia-stripping tank for selective removal of ammonia while not changing the concentration of organic material in the wastewater.

Another feature of the invention is that the apparatus includes a anaerobic fermenter that is designed to allow the sludge sedimented therein to be fermented to produce organic acids. The acids can be utilized in phosphorous removal.

A further feature of the apparatus is that it includes an Anammox tank. In the tank $NH_4^+$ and $NO_2N$ can be oxidized in the supernatant of the wastewater, which has been returned from a sedimentation tank.

A further feature of the apparatus is that it includes a biopond, which is a structure comprising a biomaker and an air generating unit. The term "biomaker" means a microorganism-activating unit containing a biocomp in a crushed stone bed. The term "biocomp" refers to a body having fixed soil microbes. The biopond activates the microorganisms to enhance the efficiency of the wastewater treatment.

The biopond is designed so that the flow of the original wastewater into the biopond can be blocked if desired to starve microorganisms therein. The ability of the microorganism to digest organic material in the wastewater in subsequent steps can be maximized by such blocking.

The aeration tank in the present invention can be divided into four stages, which facilitate the mixing of the microorganisms with the wastewater and the adjusting of the amount of dissolved oxygen. Furthermore, the tank is fitted with a mixer at one end, where air feeding does not occur. Thus, the tank is advantageous in facilitating denitrification and subsequent denitrification.

A further feature of the invention is the use of a sedimentation tank that is designed to feed the sedimented sludge into a biopond and return the supernatant into an Anammox tank. The sludge activates microorganisms in the biopond. The returned supernatant is subjected to nitrogen removal in the Anammox tank.

A further feature of the invention is the use of the aggregation-sedimentation tank, in which residual organic material and nutrients and suspended material can be treated with chemicals and the water quality can be managed stably and efficiently.

DETAILED DESCRIPTION OF THE INVENTION

Figure 1:
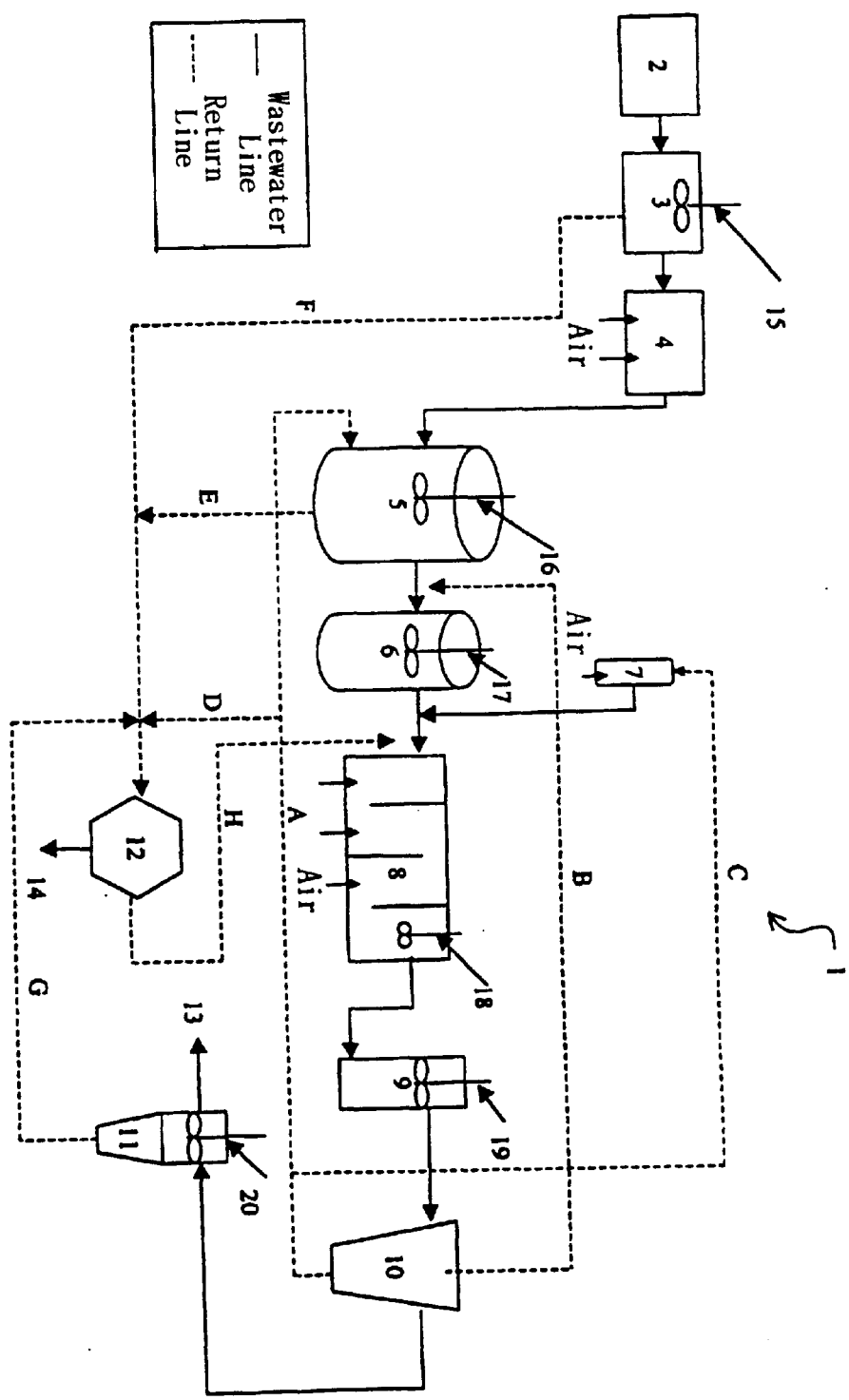
FIG. 1 is a schematic view showing the process for treating wastewater according to the present invention.

The method and the apparatus for treating wastewater according to the present invention will be more particularly described referring to the drawings appended hereto and the examples below.

FIG. 1 is a schematic view showing the process for treating wastewater according to the present invention. Apparatus 1 for treating a highly concentrated night soil or livestock wastewater is constituted as indicated below:

The properties of livestock wastewater, such as its discharge and concentration, vary widely depending on several factors, e.g., the passage of time, seasonal factors, etc. Equalization tank 2 equalizes large variations in the amount of discharge and concentration of wastewater. In chemical solid-liquid separator 3, the wastewater is treated with an aggregating agent, such as ferric chloride, to separate out suspended material and organic nitrogens.

This results in suitable concentrations in the wastewater for subsequent treatment. Among nitrogenous substances, $NH_3$ is released into the atmosphere by blowing air into the wastewater. Based on this principle, ammonia-stripping tank 4 can selectively remove ammonia nitrogen through the supply of air without losing organic material.

In Anaerobic fermenter 5, non-degradable organic material can be subjected to hydrolysis by anaerobic microorganisms. Also, organic acids are produced by the fermentation of the sludge returned from sedimentation tank 10.

In Anammox tank 6, $N_2$ gases are generated as a result of the reaction of $NO_2$—N (produced in aeration tank 8) with $NH_4^+$ under an anaerobic condition and released into the atmosphere. Biopond 7 activates soil microorganisms. The activated microorganisms are transferred to and can be used in aeration tank 8. Aeration tank 8 can induce denitrification of wastewater. In tank 8, there exist a lot of aerobic microorganisms, including the activated microorganisms supplied from biopond 7. The microorganisms oxidize organic material in the wastewater using oxygen continuously fed to tank 8 and nitrificate ammonia nitrogens. The nitrificated nitrogens fly out to the atmosphere as nitrogen gases in denitrification tank 9. The wastewater and microorganisms transferred through fermenter 5, aeration tank 8 and denitrification tank 9 are solid-liquid separated under gravity in sedimentation tank 10. The suspended material, phosphorous and organic material remaining in the wastewater, are then finally removed by treatment of a chemical in aggregation-sedimentation tank 11.

The sludge is generated from separator 3, fermenter 5, sedimentation tank 10 (from which waste sludge is discharged), and aggregation-sedimentation tank 11 during the process according to the present invention. It is then subject to dewatering in dehydrator 12. The supernatant water in tank 11 is finally discharged. Dewatered cake 14 in dehydrator 12 can be transferred to a compost depot and utilized in composting or can be disposed in a landfill.

The transferring route of the sludge is as important as the wastewater route in treatment process 1. The sludge route is indicated as a dashed line in FIG. 1. More specifically, the sedimented sludge, which is solid-liquid separated in tank 10, transferred to fermenter 5 through route A and, then, subjected to anaerobic fermentation to produce organic acids. The sedimented sludge is also responsible for maintaining MLSS in aeration tank 8. Excess sludge that is not necessary for the maintenance of MLSS is transferred as waste sludge to dehydrator 12 along route D. The sedimented sludge in tank 10 is transferred to biopond 7 through route C. The supernatant water in tank 10 is carried to Anammox tank 6 along line B. The sludge in tank 11 is transferred to dehydrator 12 through route G. The sludge resulted from separator 3 and fermenter 5 is also transferred to dehydrator 12 through routes F and E, respectively.

The dewatered cake generated by dehydrator 12 can be utilized as compost and disposed to landfill. The abscission solution is transferred to aeration tank 8 through route H.

The process according to the invention will be described in further detail below.

There is a very wide variation in the generating conditions of the wastewater to be treated in the inventive process, e.g., night soil or livestock wastewater. The amount and concentration of material generated largely vary depending on the source area, seasonal factors and the passage of the time. To treat such wastewater, it is essential to equalize its concentration and flow rate. This is advantageous in achieving high efficiency in subsequent treatment procedures. Tank 2 is responsible for equalizing the concentration and flow rate of the wastewater that is irregularly generated. The size of equalization tank 2 can be suitably 2 to 3 times the average flow rate per day. But because equalization tank 2 emits severe odor, it can be necessary to reduce the generation of odor by returning the sludge from sedimentation tank 10 to the equalization tank (not shown).

The resulting equalized wastewater is transferred from tank 2 to solid-liquid separator 3 which is fitted with mixer 15. The wastewater contains a high concentration of suspended material and organic material and, thus, has to be pretreated with a chemical agent for efficient treatment in subsequent steps. Particularly, livestock wastewater contains a large amount of suspended material formed from night soil and feed debris, in addition to a high concentration of organic material. This seriously hinders the maintenance of a suitable MLSS in aeration tank 8. This problem can be solved by treating the wastewater in solid-liquid separator 3 with an aggregating agent. The organic and suspended material and organic nitrogen can be partially removed in the form of precipitated sludge. As an aggregating agent, an anionic or cationic polymer can be used depending on the properties or condition of the wastewater. The precipitated sludge is transferred into dehydrator 12 through route F, as illustrated in FIG. 1, and finally dewatered.

After the removal of the precipitated sludge, the remaining wastewater in separator 3 still contains a very significant amount of nitrogenous substances in view of the total content of organic material. Thus, a shortage of organic material may be caused, which hampers efficient treatment in subsequent procedures. In order to selectively remove ammonia nitrogen, which constitutes 60–70% of all the nitrogenous substances, without a loss of organic material, the wastewater can be subjected to ammonia stripping in tank 4.

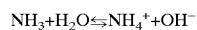

$$NH_3 + H_2O \leftrightarrows NH_4^+ + OH^-$$

The above equation represents an equilibrium condition of Ammonia nitrogen in wastewater. If the pH value of the wastewater rises over pH 7.0, the equilibrium condition will shift left and the ion $NH_4^+$ will be converted to $NH_3$. The $NH_3$ will be released to the atmosphere by stirring. Based on this principle and the fact that the livestock wastewater itself has a high pH (pH 9–9.5), Ammonia stripping tank 4 can remove ammonia nitrogen from the livestock wastewater by air feeding.

The wastewater stripped in tank 4 is flowed into anaerobic fermenter 5. In fermenter 5, there exist anaerobic microorganisms to break down non-degradable organic material in the wastewater into forms that can be feasibly taken up by aerobic microorganisms in subsequent procedures. Fermenter 5 is equipped with a heating device, which maintains a constant internal temperature of fermenter 5 (e.g., 30° C.). Thus, it is possible to prevent reduced efficiency in the removal of nitrogen and to assure good activity of the anaerobic microorganisms. Also, mixer 16 is installed for the purpose of harmonious mixing of anaerobic microorganisms and the wastewater upon the inflowing of the microorganisms and cause easy desorption of generated gases (for example, $CH_4$, $CO_2$, $H_2$, $H_2S$ and etc.)

The sludge is periodically eliminated from the bottom of fermenter 5 and, then, transferred to dehydrator 12 through route E as illustrated in FIG. 1. In fermenter 5, the sludge returned from sedimentation tank 10 is fermented to produce organic acids, such as acetic acid, propionic acid, butyric acid, valeric acid and capric acid; and dephosphorization microorganisms contained in the sludge are activated under anaerobic conditions. As is well known in the art, the activation of dephosphorization microorganisms can be achieved through the suitable adjustment of several environmental factors, such as temperature, pH, retention time, concentration, and control of inhibiting material. Such activated microorganisms release their intracellular phosphorous in the form of phosphate ($PO_4^{3-}$), but the amount of phosphorous taken in under aerobic conditions is much larger than the released amount. During this process, the microorganisms can cumulate organic acids in their bodies and utilize them as an energy source. The organic acids are formed as a result of fermentation in fermenter 5. In addition, fermenter 5 serves to denitrify the remaining nitrogen. In fermenter 5, it is required to restrict the retention time of the wastewater within a range of 2 to 3 days so that the fermentation stage does not shift from the organic acid-forming to the methane-forming stage.

The wastewater discharged from fermenter 5 and the supernatant of sedimentation tank 10 is flowed into Anammox tank 6 through route B as shown in FIG. 1. The term "Anammox" means the process of oxidation of ammonium to $N_2$ gas by Anammox microorganisms, wherein an ammonium ion ($NH_4^+$) is used as an electron donor, and nitrous ion ($NO_2^-$) and nitrate ion ($NO_3^-$) are used as a single carbon source.

A complete scheme of the Anammox reaction is represented below:

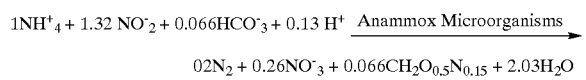

$$1NH^+_4 + 1.32\, NO^-_2 + 0.066 HCO^-_3 + 0.13\, H^+ \xrightarrow{\text{Anammox Microorganisms}}$$
$$02N_2 + 0.26 NO^-_3 + 0.066 CH_2O_{0.5}N_{0.15} + 2.03 H_2O$$

Based on the above-described principle, Anammox tank 6 carries out oxidation of nitrites or nitrates to nitrogen gases in the supernatant of sedimentation tank 10 by using Anammox microorganisms therein. A heating unit is provided in Anammox tank 6 to maintain a suitable temperature for the Anammox microorganisms. The temperature is preferably from 20 to 40° C. Anammox microorganisms include Nitrosomonas, and, particularly, Flexibacter is typical (Mike S. M. Jetten, et al., The anaerobic oxidation of ammonium, FEMS Microbiology Reviews 22 (1999) 4221–437). Also, Mixer 17 is provided to help in efficiently mixing the microorganisms with the wastewater and also contributes to the control of the temperature.

Figure 2:
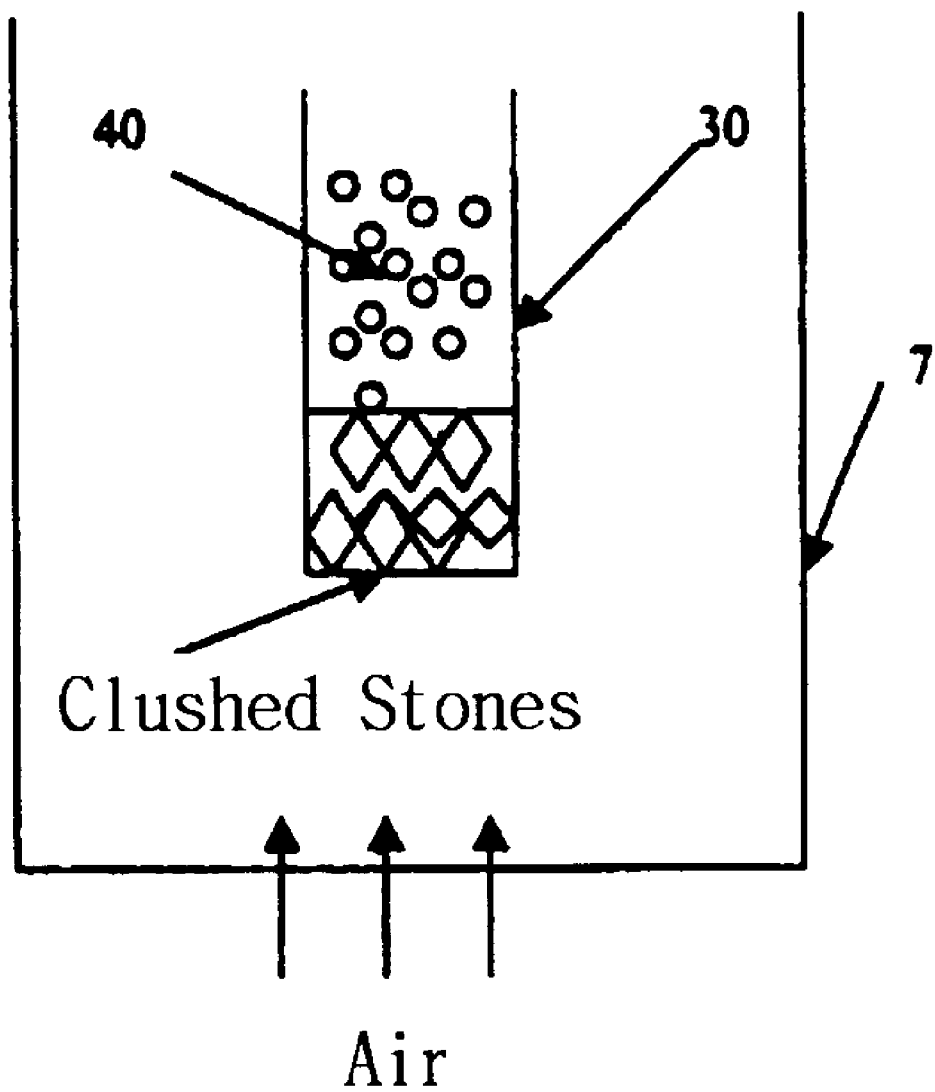
FIG. 2 is a detailed view for biopond.

With reference to FIG. 2, Biomaker 30 charged with Biocomp 40 is mounted on Biopond 7. On the top portion, Biomaker 30 includes Biocomp 40, in which several types of microorganisms are fixed in a mixed state. The bottom of the Biomaker contains crushed stones having a lot of minerals. The crushed stones continuously provide Biomaker 30 with minerals. These minerals can induce maximization of the activity of the Biocomp microorganisms. The biocomp is a body having fixed microorganisms that essentially comprises Bacillus and Actinomycets. The microorganisms are activated by both the sludge returned from sedimentation tank 10 and a growth condition set in the Biopond. First, the microorganisms can be activated under an aerobic condition that forms from air continuously fed into Biopond 7. The activation takes about 2 days. Such activated microorganisms are further stimulated by the sludge from sedimentation tank 10. Thereafter, the activated microorganisms are fasted by the interruption of sufficient feed, i.e., by blocking the influx of source water, whereby the capacity of the metabolism of the activated microorganisms in aeration tank 8 can be enhanced.

The wastewater subjected to Anammox reaction in tank 6 is influxed to aeration tank 8. Also, the activated microorganisms in Biopond 7 are sent to tank 8. Aeration tank 8 can induce denitrification and is divided into 4 stages. Since the tank is divided into 4 stages, mixing can be carried out well and it is possible to keep different BODs. Also, nitrification and denitrification can be induced and alkali value can be controlled to maintain a balance between reductions and increases of the value. Furthermore, divided tank 8 contributes to the prevention of inhibitory effects that are caused by a rapid decrease in the pH. The lowest stage is not fed any air and is fitted with Mixer 18 to maintain 0.5 mg/L of BOD. As a result, the efficiency of the denitrification process in the next step can be induced to a maximum. In tank 8 also, partial denitrification can be occurred to increase the alkali value and, thus, to contribute to a pH buffering effect in the aeration tank.

In tank 8, aerobic microorganisms play a role both in the oxidation and nitrification of organic material through their metabolism and in the removal of phosphorous through luxury uptake. During this process, the activated microorganisms from Biopond 7 exhibit a higher metabolic activity. The nitrification in tank 8 indicates the oxidation of ammonia nitrogen to $NO_{3-}$ via $NO_2^-$ by Nitrosomonas and Nitrobacter. In the process, alkali is consumed to cause a decrease in the pH value. The phosphorous removal from tank 8 is a result of the so-called "luxury uptake." The luxury uptake refers to an event where, during the synthesis of cells, dephosphorization microorganisms that have released phosphorous in the form of phosphate uptake a much larger amount of phosphorous than the aerobic microorganisms existing in aeration tank 8. The term "dephosphorization microorganisms" collectively refers to conventional dephosphorization microorganisms in the field of wastewater treatment. The most common of these microorganisms is Acinetobacter.

The wastewater is then influxed to tank 9 for denitrification via aeration tank 8. In denitrification tank 9, Denitrifieres planted therein use organic material to convert nitrates in the wastewater into nitrogen via the pathway $NO_3 \rightarrow NO_2 \rightarrow NO \rightarrow N_2O \rightarrow N_2$. The resulting nitrogen is removed. Optionally, an exogenous carbon source such as acetic acid, citric acid or methanol can be used as an electronic donor for the denitrification to enhance the efficiency of the denitrification. However, using such exogenous carbon sources requires separate equipment and may increase the total cost. In the Example below, thus, endogenous carbon in the sludge and wastewater were therefore used in inducing denitrification. In addition, in the process according to the invention, the sludge that settles down at the bottom of tank 10 is returned through route A to fermenter 5 as shown in FIG. 1 and used in a secondary denitrification in fermenter 5. This provides a complete removal of nitrogen.

Denitrification tank 9 is designed so that the wastewater can be influxed at the bottom. This structure is advantageous in bringing the wastewater into sufficient contact with microorganisms and in mixing the wastewater with the microorganisms. Also, mixer 19 is provided in tank 9 and facilitates the bringing of the wastewater into contact with microorganisms and the degassing of nitrogen gas from the microorganisms.

The wastewater is transferred to sedimentation tank 10 passing denitrification tank 9. In tank 10, the wastewater is subjected to solid-liquid separation to result in the sludge. In sedimentation tank 10, the microorganisms can be first sedimented spontaneously under the force of gravity because they are heavier than other substances in the wastewater. In order to facilitate collection of the subsided sludge, tank 10 has a gradient therein. A part of the subsided and collected sludge is returned to Biopond 7 through route E as shown in FIG. 1 and another part of the sludge is returned to Fermenter 5 through route A. Another part of the sludge is sent to aeration tank 8 for the maintenance of MLSS. The other waste sludge is transferred to dehydrator 12 through route D as illustrated in FIG. 1.

The wastewater is flowed from sedimentation tank 10 to aggregation-sedimentation tank 11 which is fitted with mixer 20. In tank 11, the wastewater is treated with an aggregating agent. Consequently, the remaining phosphorous, the suspended solid, and a portion of the organic material are aggregated and then completely removed. An aggregating agent used can be variously selected depending on a type of treatment apparatus (in the Example below, ferric chloride was used). An amount of the aggregating agent used can be adjusted depending on a water quality of the effluent. The aggregated sludge is precipitated under the force of gravity, carried to dehydrator 12 and disposed. The supernatant is finally discharged out as shown as the reference 13 in FIG. 1.

The various sludge is sent to the dehydrator (e.g., from tanks 3, 5, 10 [from which the waste sludge is emitted] and 11). The sludge is separated from water by virtue of a mechanical force such as compression pressure or centrifugal force and is discharged in the form of cake 14, which has reduced water content. The cake can be then utilized in producing solid compost. The abscission liquid separated from the sludge is returned to and retreated in aeration tank 8 through route H in FIG. 1.

TEST EXAMPLES AND COMPARATIVE EXAMPLES

The benefits of the invention are demonstrated by the following examples.

Abbreviations used in the Examples indicate the following means:

COD indicates a chemical oxygen demand. COD is classified into 2 types, CODcr and CODmn, according to oxidizing agents used in its determination. CODcr is determined using potassium bichrominate ($K_2Cr_2O_7$) as an oxidizing agent, and CODmn is determined using potassium permanganate ($KMnO_4$) as an oxidizing agent.

BOD indicates a biological oxygen demand.

TSS (total suspended solids) indicates the organic and inorganic material left on a filter (0.1 micron) after a water sample is filtered through it. TSS is also often referred as SS. In cases where it needs to be differentiated from VSS, TSS is used. In the field of environmental engineering, SS generally means TSS. TSS is measured by weighing the material left on the filter (0.1 micron) after filtering and drying in the oven at 105° C. and expressed in mg solids per liter of water.

TKN (total Kjeldhal Nitrogen) refers to the sum of the concentrations of both organic nitrogens and the inorganic nitrogen $NH_3$—N.

T-N (Total Nitrogen) refers to the total amount of nitrogen, including organic nitrogens and the inorganic nitrogens $NO_2$—N and $NO_3$—N in wastewater.

T-P (total phosphorous) refers to the sum of soluble and insoluble phosphorous in wastewater.

TEST EXAMPLE

A laboratory scale of a reactor according to FIG. 1 was constructed. An experiment was carried out to treat source wastewater taken from a treatment plant of livestock wastewater. The numerous instruments and the size of the reactor used in the experiment are summarized in Table 1 below.

TABLE 1

| Reactors and Instruments | Size | Miscellaneous |
|---|---|---|
| Anaerobic Fermenter | 9.0 L ($\phi$ = 18 cm, H = 45 cm) | Round Rod-type, Seeding Digestion Sludge, 30° C. |
| Anammox tank | 6.0 L ($\phi$ = 18 cm, H = 33 cm) | Round Rod-type, Seeding Digestion Sludge, 30° C. |
| Electric coil & Controller | 600 W | Temperature Maintenance |
| Biopond | 0.45 L ($\phi$ = 8 cm, H = 18 cm) | Round Rod-type, Biocomp 12 g |
| Aeration Tank | 37.50 L ($\phi$ = 44.0 cm, B = 20.3 cm, H = 57 cm) | Sphere-type |
| Denitrification Tank | 1.5 L ($\phi$ = 10 cm, H = 30 cm) | Round Rod-type, |
| Precipitation Tank | 1.5 L ($\phi$ = 18 cm, H = 30 cm) | Conical-type, Hopper Slope is maintained as 60°. |
| pH meter | Orione 250 A | pH, ORP, Temperature Determination |
| Transferring Pump | Master-flex pump | 2 Heads |
| Mixer | M6GA30M | 60 rpm |
| Ferric Chloride | $FeCl_3$ | Aggregating agent |
| Blower | Koreadakkasi ™ SPP-200 GJ-H | A capacity of 210 L/min |

A pH meter was used to measure the pH and ORP (Oxidation Reduction Potential) in the aeration tank, anaerobic fermenter, Anammox tank and denitrification tank, etc. The blower was provided to feed air into the aeration tank and biopond. The source water was fed into the reactor by means of transferring pump 5 times a day in an equal amount per each time. Each Reacting tanks were placed such that the wastewater could be moved along with a naturally formed flow.

TABLE 2

| Type | CODcr | BOD | TSS | TKN/$NH_3$ | $NO_3$-N | T-P |
|---|---|---|---|---|---|---|
| Source wastewater | 54,000 | 19,000 | 27,500 | 4,500/2,900 | — | 830 |
| After Solid-Liquid Separation | 32,000 | 12,000 | 8,000 | 3,900/2,400 | — | 400 |
| After Stripping | 27,000 | 9,900 | 8,000 | 2,500/1,400 | — | 360 |
| After Anaerobic Fermentation | 22,800 | 7,700 | 13,500 | 1,440/350 | — | 350 |
| After Anammox | 20,700 | 7,500 | 10,500 | 950/120 | 1.8 | 330 |
| After Sedimentation | 1,050 | 65 | 210 | 85/19 | 15 | 68 |
| After Aggregation | 330 | 30 | 29 | 16/8.5 | 14 | 5.8 |

The results summarized in Table 2 are the averages obtained from the laboratory operation. The source water was taken from treatment plant Y, located in Gyeong-gi Province, Republic of Korea. The pretreatment procedures, solid-liquid separation and stripping were all carried out simultaneously. The samples, which were pretreated and stored at 4° C., was injected into the aeration tank for experimentation by a metering pump. The resulting water after completion of the treatment showed very good quality and satisfied the requirement for effluent water from night soil and livestock treating plants. BOD was 300 mg/L, SS was 29 mg/L, and legal requirements, 60 mg/L of T-N and 8 mg/L of T-P were satisfied.

COMPARATIVE EXAMPLE

Figure 3:
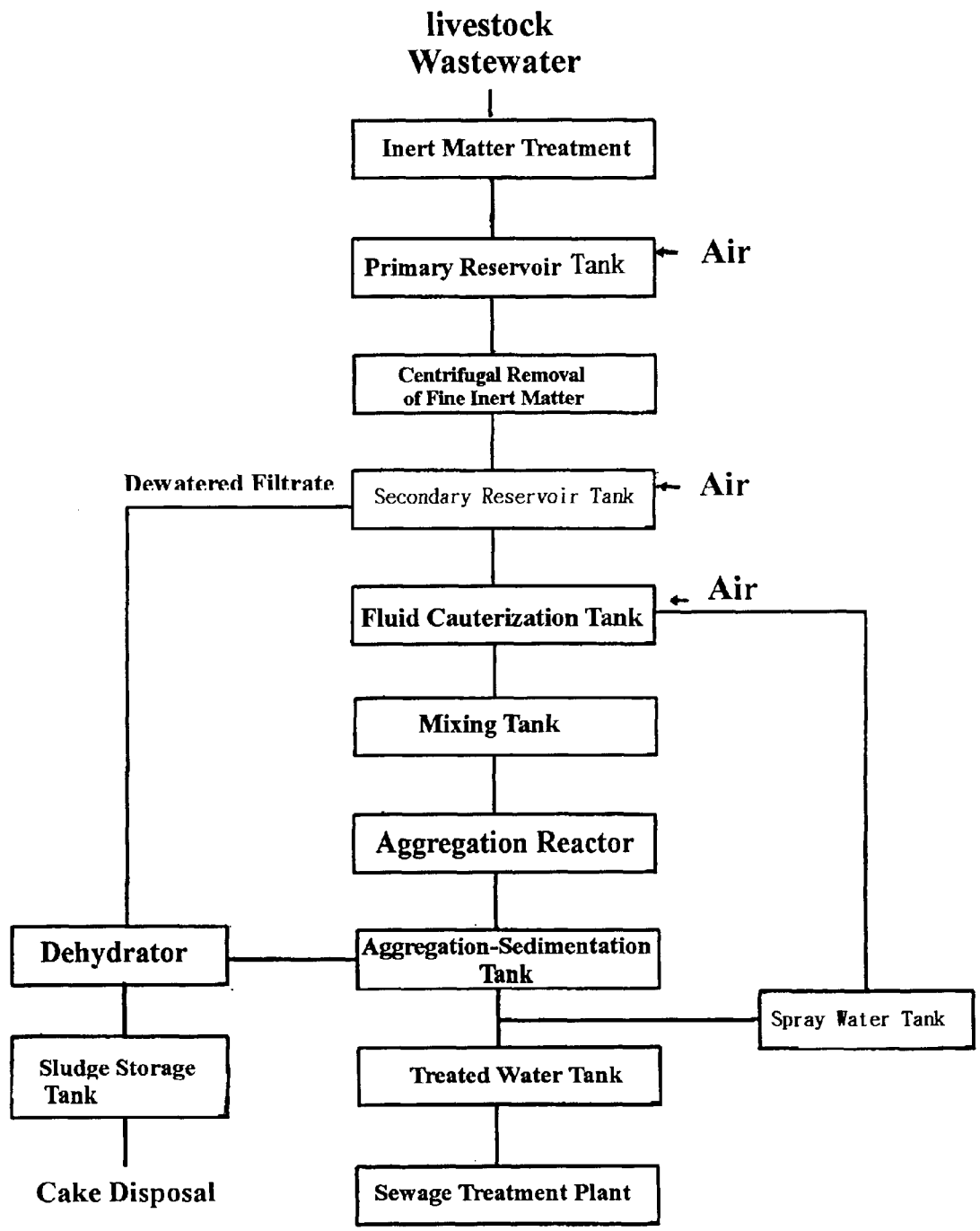
FIG. 3 is an exemplary structure of a conventional process for livestock wastewater treatment using a fluid cauterization tank.

Table 3 shows results obtained from the conventional wastewater treatment procedure illustrated in FIG. 3. This procedure is different from the inventive process in that it uses a liquid phase.

TABLE 3

| Type | CODmn | BOD | SS | T-N | T-P |
| --- | --- | --- | --- | --- | --- |
| Source wastewater | 10,000 | 18,000 | 10,000 | 3,000 | 80 |
| Reservoir Tank Effluent | 4,952 | 6,830 | 1,353 | 2,032 | 80.4 |
| Final Effluent | 296 | 199 | 184 | 296 | 15 |

Comparing the data in Table 2 with those in Table 3, the effluent obtained according to the invention had a very low value of 30 of BOD, whereas the final effluent obtained according to the conventional process had 199 of BOD. It is about 6 times above that of the invention. In cases where the process shown in FIG. 3 is used in wastewater treatment, the effluent from the process cannot be discharged to rivers unless it is subjected to another treatment in a sewage disposal plant Given the above results, the process for treating wastewater according to the present invention provides good efficiency in removing organic material and nutrients.

We claim:

1. A method for treating wastewater comprising the following steps:
    (a) equalizing a flow rate and an amount of concentrated wastewater having at least 10,000 mg/L of BOD in an equalization tank;
    (b) carrying out solid-liquid separation of equalized wastewater from step (a) by adding an aggregating agent thereto so that concentrations of organic material and nitrogen in the wastewater can be adjusted to desired levels;
    (c) stripping ammonia selectively from the wastewater leaving the concentration of organic material unchanged;
    (d) fermenting non-degradable organic material in the wastewater from step (c) by using an anaerobic microorganism, whereby the material can be converted into forms that can be easily fed to aerobic microorganisms in subsequent steps; and also fermenting sludge that is returned from step (i) below to produce organic acids;
    (e) carrying out Anammox reaction of ammonia in the wastewater with $NO_2$—N in the sludge, which underwent anaerobic fermentation in step (d) after being returned from step (i);
    (f) activating soil microorganisms that are contained as a solid form in a biopond;
    (g) feeding the activated microorganisms into a denitrification-inducing aeration tank, which then contributes both to the degradation of organic material and to the nitrification from ammonia nitrogen in the wastewater from step (e) to $NO_3$—N in cooperation with aerobic microorganisms, which already exist in the aeration tank, and mixing to induce denitrification;
    (h) denitrificating the wastewater from step (g) by reducing nitrates in the wastewater to nitrogen through endogeneous respiration of the microorganisms under a condition in which oxygen does not exist and external carbon sources are not introduced;
    (i) carrying out a solid-liquid separation of the wastewater from the microorganisms to produce a precipitated sludge and a supernatant and returning a part of the precipitated sludge to step (d) above; and
    (j) removing any residue from the supernatant from step (i) by aggregating them and effluenting the finally treated wastewater.

2. An apparatus comprising the following elements:
    (a) an equalization tank for equalizing a flow rate and concentration of wastewater that has originated from a source,
    (b) a chemical solid-liquid separator for adjusting concentrations of organic material and nitrogen,
    (c) a stripping tank for selectively removing ammonia nitrogen while leaving the concentration of organic material in the wastewater unchanged,
    (d) an anaerobic fermenter for both fermenting non-degradable organic material in the wastewater by using an anaerobic microorganism, whereby said organic material can be converted into forms that can be easily fed to aerobic microorganisms in subsequent steps, and for fermenting sludge that is returned from a sedimentation tank to produce organic acids;
    (e) an Anammox tank for reacting ammonia in the wastewater with $NO_2$—N in said sludge to generate nitrogen gases;
    (f) a biopond that contains solidified soil microorganisms;
    (g) a denitrification-inducing aeration tank both for the degradation of organic material in the wastewater by aerobic microorganisms and for the nitrification of ammonia nitrogen into $NO_3$—N, said aerobic microorganisms being activated and fed from the biopond into the aeration tank;
    (h) a denitrification tank to reduce nitrates in the wastewater to nitrogen through endogeneous respiration of the microorganisms under a condition in which oxygen does not exist and external carbon sources are not introduced;
    (i) a sedimentation tank for solid-liquid separation of microorganisms from the denitrified wastewater in which organic material has been nearly completely oxidized;
    (j) an aggregation-sedimentation tank for aggregating and removing residual material from a supernatant obtained from said sedimentation tank; and
    (k) a dewatering tank for reducing part or all of the water in a sludge discharged from said solid-liquid separator, anaerobic fermenter, sedimentation tank and aggregation-sedimentation tank.

3. The apparatus according to claim 2, wherein the denitrification-inducing aeration tank is divided into four stages to facilitate the mixing and the adjustment of dissolved oxygen amount and is fitted with a mixer at one end, where air feeding does not occur, to facilitate denitrification and subsequent denitrification.

4. A method for treating wastewater comprising the following steps:
    (a) equalizing a flow rate and an amount of wastewater having at least 10,000 mg/L of BOD in an equalization tank;

(b) carrying out solid-liquid separation of equalized wastewater from step (a);

(c) stripping ammonia selectively from the wastewater leaving the concentration of organic material unchanged;

(d) fermenting non-degradable organic material in the wastewater from step (c) and also fermenting sludge that is returned from step (i) below;

(e) carrying out Anammox reaction of ammonia in the wastewater with $NO_2$—N in the sludge;

(f) activating soil microorganisms that are contained as a solid form in a biopond;

(g) feeding the activated microorganisms into a denitrification-inducing aeration tank with the wastewater from step (e);

(h) denitrificating the wastewater from step (g);

(i) carrying out a solid-liquid separation of the wastewater from the microorganisms to produce a precipitated sludge and a supernatant and returning a part of the precipitated sludge to step (d) above; and (j) removing any residue from the supernatant from step (i) by aggregating them and effluenting the finally treated wastewater.

5. An apparatus comprising the following elements:

(a) an equalization tank for equalizing a flow rate and concentration of wastewater that has originated from a source;

(b) a solid-liquid separator for adjusting concentrations of organic material and nitrogen;

(c) a stripping tank for selectively removing ammonia nitrogen while leaving the concentration of organic material in the wastewater unchanged;

(d) a fermenter for both fermenting organic material in the wastewater and for fermenting sludge that is returned from a sedimentation tank;

(e) an Anammox tank;

(f) a biopond that contains solidified soil microorganisms;

(g) a denitrification-inducing aeration tank for the degradation of organic material by microorganisms being activated and fed from the biopond into the aeration tank;

(h) a denitrification tank;

(i) a sedimentation tank for solid-liquid separation of microorganisms from the denitrified wastewater;

(j) an aggregation-sedimentation tank for aggregating and removing residual material from a supernatant obtained from said sedimentation tank; and (k) a dewatering tank for reducing part or all of the water in a sludge discharged from said solid-liquid separator, anaerobic fermenter, sedimentation tank and aggregation-sedimentation tank.

6. The apparatus according to claim 5, wherein the denitrification-inducing aeration tank is divided into four stages and is fitted with a mixer at one end.

* * * * *